… … …

United States Patent [19]
Iinuma

[11] 4,144,705
[45] Mar. 20, 1979

[54] TIMEPIECE CIRCUIT DEVICE

[75] Inventor: Yoshio Iinuma, Iruma, Japan

[73] Assignee: Citizen Watch Co. Ltd., Tokyo, Japan

[21] Appl. No.: 897,902

[22] Filed: Apr. 19, 1978

Related U.S. Application Data

[63] Continuation of Ser. No. 729,727, Oct. 5, 1976, abandoned.

[30] Foreign Application Priority Data

Oct. 15, 1975 [JP] Japan .................................. 50-140086
Oct. 16, 1975 [JP] Japan .................................. 50-124705

[51] Int. Cl.² .................... G02F 1/13; G04B 29/00; G04C 3/00
[52] U.S. Cl. .................. 58/52 R; 58/23 R; 58/55; 58/127 R; 340/378.2; 350/331; 361/395
[58] Field of Search ............. 58/4 A, 23 R, 50 R, 58/23 A, 52, 53, 54, 55, 88, 127 R; 350/331; 361/95; 340/324 R

[56] References Cited

U.S. PATENT DOCUMENTS

| | | | |
|---|---|---|---|
| 3,784,725 | 1/1974 | Perkins et al. | 58/23 R |
| 3,863,436 | 2/1975 | Swarzschild | 58/53 |
| 3,914,021 | 10/1975 | Nistimura | 350/160 LC |
| 3,986,335 | 10/1976 | Harper | 58/50 R |

*Primary Examiner*—Edith S. Jackmon
*Attorney, Agent, or Firm*—Sherman & Shalloway

[57] ABSTRACT

A timepiece circuit device including an upper frame, a lower frame and a print base board having a conductive pattern for mounting and electrically connecting a semiconductor device. At least one of said upper and lower frames is provided with a connecting portion electrically connecting electronic parts and a recess in which said electronic part is fitted and said semiconductor device is received. Said upper frame, said circuit base board and said lower frame are overlapped with each other thereby providing a circuit device having semiconductor devices capable of being miniaturized for a timepiece.

6 Claims, 9 Drawing Figures

TIMEPIECE CIRCUIT DEVICE

This is a continuation, of Application Ser. No. 729,727, filed Oct. 5, 1976, which is now abandoned.

BACKGROUND OF THE INVENTION

1. Field of the Invention

This invention relates to a circuit device for an electronic timepiece having a semiconductor device of a complementary metal oxide semiconductor-large scale integrated circuit (CMOS-LSI) and the like. In addition, this invention relates to the improvement of a lead frame used in the mounting of a semiconductor device, particularly to a lead frame structure enabling wireless bonding wherein an aluminum wire or gold wire is not necessary.

2. Description of the Prior Art

A CMOS-LSI composed of one or two chips is used for an oscillation circuit, frequency division circuit, display driving circuit, etc. in many electronic wristwatches with a crystal oscillation system. The integrated circuit is packed by flat-package or resin-molding, etc. and then it is fixed to a print circuit board by solder. In case of digital-type crystal wristwatches of which the manufacture has been increased substantially, a circuit substrate itself may be utilized as a timepiece base body since no movement to display time is required. The cost of the timepiece depends on the method of packaging a semiconductor device such as CMOS-LSI, etc. In addition, the timepiece dimensions are influenced by the packaging method of a watch movement, the reliability of the semiconductor device, etc.

Further, heretofore, there have been proposed various kinds of methods, i.e., Minimod method, spider method and method of making a thin bonding part of a lead frame as a method of directly bonding a semiconductor integrated circuit chip and leads. In every conventional method, bumps of 20 - 50 μm in height are formed on the electrodes of an IC chip in the case where the IC chip having multiple electrodes and leads are simultaneously bonded. In this case, on the side of the leads there is used a method wherein a copper foil is bonded to a flexible sheet and is etched into a pattern so that the plating may be effected or a method wherein the electrodes of the IC chip and lead frames of 200 μm in thickness are coupled with a thin metal foil.

Therefore, the vapor deposition process, partially plating process, etc. are required to form bumps of 20-50 μm in height on the electrodes of the IC chip and its cost is increased by 20-30% as compared with an ordinary aluminum electrode chip. A flexible sheet for use the Minimod method is very expensive and the manufacture of leads requires many processes. Therefore there are many problems because the mounting processes add substantially to the cost of the semiconductor device, especially a bonding process using many methods of bonding aluminum wire and gold wire as the connection system of an integrated circuit chip with a number of pins.

SUMMARY OF THE INVENTION

An object of the invention is to provide a circuit device having semiconductor devices capable of being miniaturized for a timepiece, which is low in cost and can be mass-produced.

Another object of this invention is to provide a circuit device functioning as a timepiece base body or substrate wherein electrical connections and fittings of elements can be sealed and protected.

A further object of the invention is to provide a circuit deivce wherein the conventional bonding systems are improved to simplify mounting processes including a bonding process with stronger bonding characteristics.

DETAILED DESCRIPTION OF PREFERRED EMBODIMENTS

Figure 1A:
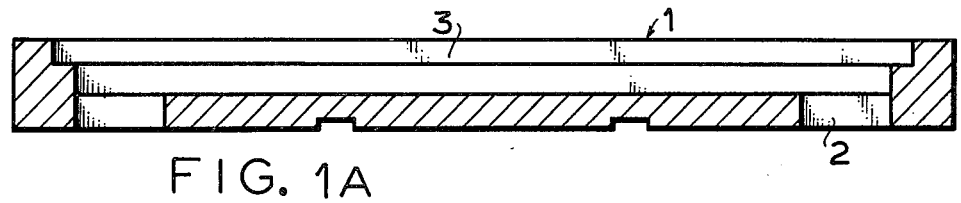
FIG. 1A is a vertical section of an upper frame showing an embodiment of this invention.
Figure 1B:
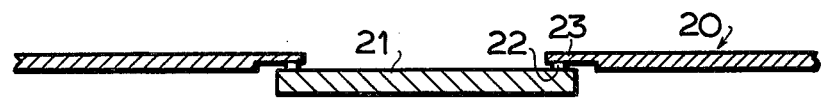
FIG. 1B is a vertical section of a circuit base board showing an embodiment of this invention.
Figure 1C:
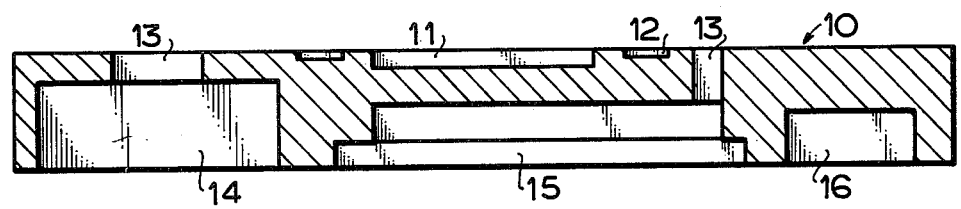
FIG. 1C is a vertical section of a lower frame showing an embodiment of this invention.
Figure 2:
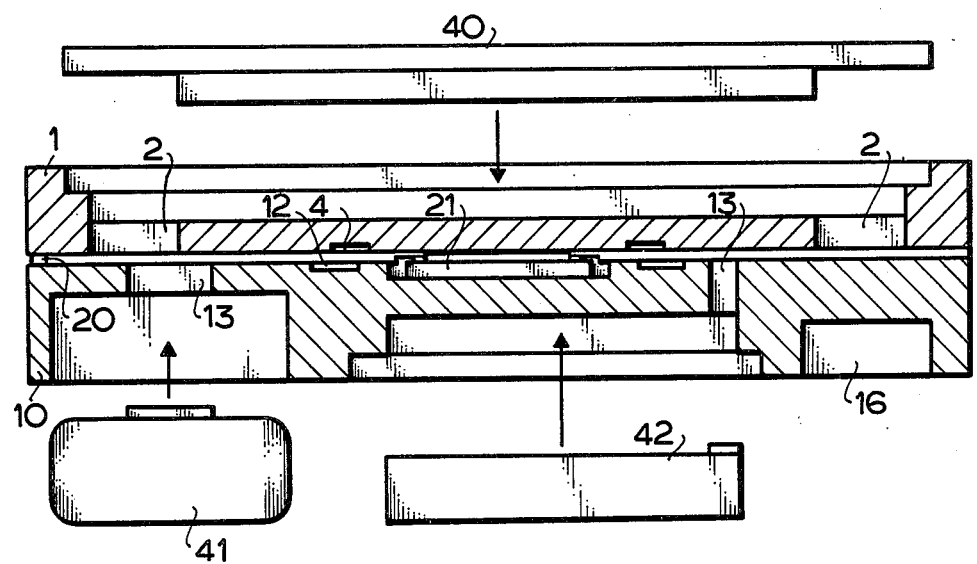
FIG. 2 is a section of an assembly comprising the upper frame, circuit base board and lower frame shown in FIGS. 1A, 1B and 1C respectively.

FIG. 1A shows an upper frame 1, FIG. 1B a circuit base board 20 and FIG. 1C a lower frame 10. FIG. 2 is assembly comprising the upper frame 1, circuit base board 20 and a lower frame 10, etc. This embodiment is suitable for a liquid crystal-type wristwatch. On the upper frame, provision is made for a hole 2 for connecting the electrodes of a liquid crystal cell and a recess 3. Reference numeral 4 depicts a recess in which a bonding material, etc. collects and which may be provided on desired parts if necessary. The circuit base board 20 in FIG. 1B is a lead frame being made into a pattern by an etching method, etc. Reference numeral 21 depicts a semiconductor device of CMOS-LSI, etc., at the periphery of which a bump 22 of 30 μm in height is formed.

An end 23 of the lead frame 20 is made thin by a surface-etching method, etc. and is bonded to the bump 22 of the semiconductor device 21. The thickness of the lead frame 20 is generally 200-300 μm or so. If the end 23 of the lead frame 20 is made 30-50 μm or so in thickness, it is easily bonded to the semiconductor device 21. It is preferable to utilize a bonding method effected by a bonding machine employing resistor heating such as the Minimod method. On the lower frame 10 in FIG. 1C, provision is made for a recess 11 for receiving a semiconductor device 21, a recess 12 in which a bonding material collects, a hole 13 for electrical connections, a battery cell receiving recess 14, a recess 15 for receiving a crystal sealing case 42 and a recess 16 for receiving the other parts 16.

FIG. 2 is a sectional view showing a condition in which the circuit base board 20 supporting the semiconductor device 21 and the lower frame 10 is position and fixed in overlapped state by a bonding material, etc. Thus, the semiconductor device 21 is sealed up tightly into a space formed by the upper frame 1 and lower frame 10 and as the result, the semiconductor device 21 is packaged. In the case that the upper frame 1, circuit base board 20 and lower frame 10 are fixed to each other in superimposed condition by means of an epoxy resin bonding material, there arises frequently the problem that the bonding material is forced out. However, the problem may be resolved by the use of sheet-shaped bonding material and the provision of recesses in the parts of the upper frame 1 and lower frame 10.

Since a liquid crystal cell 40, battery cell 41, crystal sealing case 42 and the like are mounted on the assembly as shown in the drawing mentioned later, it is easy to support and electrically connect them.

In this embodiment, the upper and lower frames 1, 10 are low in cost if they are made of plastics. When these frames are made of a metal whose surface is treated to be insulated, they are precise in dimension and a set screw, etc. can be used to fit the elements so that they are suitable for wristwatches.

Further, in the above embodiment, use is made of a lead frame as a circuit base board, but use may be made of a sheet flexible print circuit (FPC) or print circuit board (PCB).

Figure 3A:
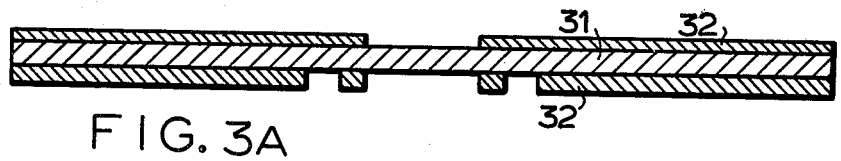
FIGS. 3A and 3B are vertical sections of lead frames showing another embodiment of this invention.
Figure 3B:
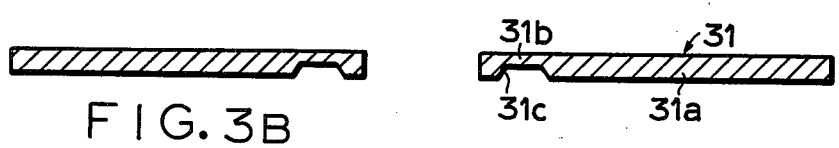
Figure 3C:
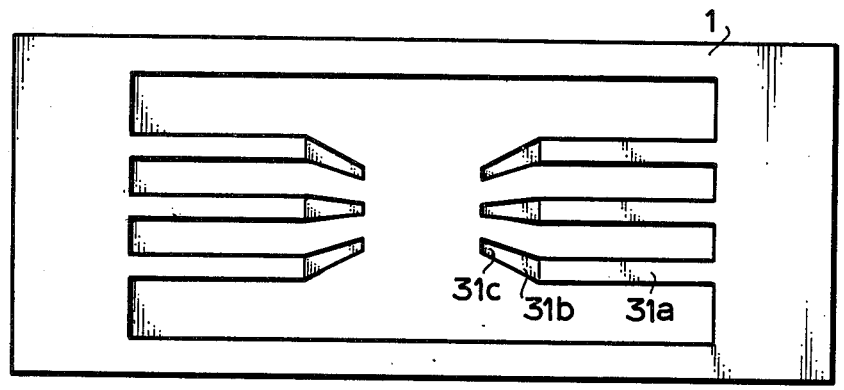
FIG. 3C is a plan view of the lead frame shown in FIG. 3A
Figure 4:
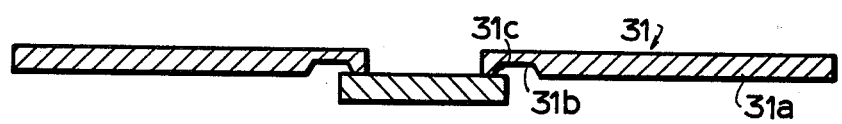
FIG. 4 is a vertical section of the lead frame in FIG. 3B and a semiconductor device in FIG. 5 which are bonded with each other.
Figure 5:
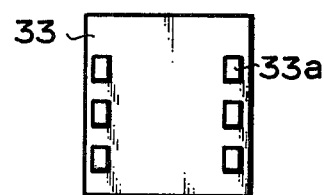
FIG. 5 is a plan view of the semiconductor device used in FIG. 4.

Furthermore, FIGS. 3A and 3B are sectional views of lead frames showing an embodiment according to the invention, FIG. 3C is a plan view thereof, FIG. 4 is a sectional view when a lead frame and a semiconductor are bonded to each other and FIG. 5 is a plan view of a single semiconductor device shown in FIG. 4.

In FIG. 3A, both surfaces of the lead frame are coated by an etching resist 32. Under this condition, the lead frame is etched for a suitable period so that the lead frames with shapes shown in FIGS. 3B, 3C may be obtained. In other words, a lead portion 31a, thin portion 31b and protrusion 31c are formed at the same time. The width of the lead portion 31a, and the thickness and width of the thin portion 31b can be adjusted by the shape of the resist and the period of etching treatment, etc. Then, the lead frame is plated by tin or solder. Afterward, the electrodes 33a of integrated circuit chip 33 and protrusions 31C of the lead frame 31 are simultaneously bonded by means of a resistor heating type heater chip such as the Minimod method. In this case, the electrodes 33a on the integrated circuit chip 33 a copper gold layer formed by a masking vapor deposition, bumps of 20-50 μm in height not being required to be bonded. Namely, simultaneous bonding may be easily effected since provision is made of a protrusion 31c at the portion on the lead frame 31 corresponding to the electrode 33a on the integrated circuit chip 33 and a thin portion 31b near the protrusion 31c. This thin portion 31b serves to increase heat radiation upon bonding so as to improve the bonding characteristics and to weaken the hardness of the lead so as to prevent exfoliation after bonding. In my experiments, it is preferrable that the thickness of the lead frame is 100-150 μm, the thickness of the thin-portion is about 30-60 μm since the deformation of the lead frame 31 is a little before bonding and bonding characteristics is good.

Therefore, this invention provides an electronic timepiece which can be automatically assembled and is low in cost since it is suitable for mass-production. In addition, the IC chip of this invention can be manufactured at a cost similar to that of an aluminum electrode type chip. The adjustment of the position is easy since an integrated chip electrode and junction are made into one body with a lead frame substrate. Simultaneous bonding can easily be effected, and close adhesion characteristics after bonding is good, thus resulting in elevation of the production and high reliability, because it is not necessary that bumps of 20-50 μm in height are formed at the side of the integrated circuit chip.

What is claimed is:

1. A module construction for an electronic watch comprising:
   (a) a liquid crystal display cell for providing a display of time information;
   (b) an integrated circuit chip for providing electric signals to drive said liquid crystal display cell;
   (c) a plastic upper frame having an upper surface formed with a recess to retain said liquid crystal display cell;
   (d) a plastic lower frame having an upper surface formed with a first recess to accommodate said integrated circuit chip and a lower surface formed with a second recess adapted to accommodate a battery and a plurality of third recesses adapted to accommodate electronic components therein respectively;
   (e) a plurality of electrical leads interposed between said upper and lower frames and providing an electrical connection between said integrated circuit chip and said liquid crystal display cell;
   (f) a bonding material connecting said lower surface of said upper frame, said leads and said upper surface of said lower frame; and
   (g) a seal formed completely around said integrated circuit chip by said upper frame, said leads, said lower frame and said bonding material.

2. The module construction for an electronic watch as claimed in claim 1 wherein said lower surface of said upper frame has a recess adjacent said first recess of said upper surface to allow said bonding material to escape and be forced out when said integrated chip is sealed within said module.

3. The module construction for an electronic watch as claimed in claim 1 wherein said upper surface of said lower frame has a second recess adjacent said first recess on the upper surface to allow said bonding material to escape and be forced out when said integrated chip is sealed within said module.

4. The module construction for an electronic watch as claimed in claim 2 wherein said electrical leads have integral protrusions for connection to electrodes of said integrated circuit chip respectively and at least one of said protrusions has a thin portion to increase bonding characteristics.

5. The module construction for an electronic watch as claimed in claim 3 wherein said electrical leads have integral protrusions for connection to electrodes of said integrated circuit chip respectively and at least one of said protrusions has a thin portion to increase bonding characteristics.

6. The module construction for an electronic watch as claimed in claim 2 wherein said electrical leads are comprised of etched, tapered protrusions for contacting electrodes of said integrated circuit chip, said electrical leads further having a thin portion of a height less than said leads adjacent said protrusions, and said protrusions having a height equal to the height of said leads.

* * * * *